(12) United States Patent
Wurtenberger et al.

(10) Patent No.: US 8,254,330 B1
(45) Date of Patent: Aug. 28, 2012

(54) TRANSITIONING TO PREVIOUS COVERAGE AREA TO EXPEDITE CALL SETUP

(75) Inventors: Andy M. Wurtenberger, Olathe, KS (US); Bryan T. Barbee, Olathe, KS (US); Caleb S. Hyde, Overland Park, KS (US); Justin R. Anderson, Prairie Village, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1001 days.

(21) Appl. No.: 12/243,223

(22) Filed: Oct. 1, 2008

(51) Int. Cl.
*H04W 36/00* (2009.01)
(52) U.S. Cl. ........ 370/331; 370/328; 370/338; 455/439; 455/434; 455/436
(58) Field of Classification Search .................. 370/328, 370/338; 455/439, 436, 442, 434, 352
See application file for complete search history.

(56) References Cited

U.S. PATENT DOCUMENTS

| 7,302,265 B1* | 11/2007 | Chalishazar et al. ......... 455/439 |
| 7,693,521 B1* | 4/2010 | Ribas et al. ................... 455/437 |
| 7,693,534 B1* | 4/2010 | Lundy et al. .................. 455/518 |
| 2006/0014557 A1* | 1/2006 | Rajkotia et al. ............... 455/522 |
| 2008/0046558 A1* | 2/2008 | Raja et al. ..................... 709/224 |

* cited by examiner

*Primary Examiner* — Kibrom T Hailu
*Assistant Examiner* — Zewdu A Beyen (57) ABSTRACT

Methods and systems are provided for expediting call setup in a wireless communication system. A mobile station operating in idle mode and under coverage of a first and second wireless coverage area receives overhead channel data for the first coverage area. The mobile station then detects a trigger to initiate connectivity with the wireless communication system. Responsive to detecting this trigger, the mobile station determines an amount of time until it will receive overhead channel data for the second coverage area and makes a determination of whether this determined amount of time is greater than a threshold. If the determined amount of time is greater than a threshold, the mobile station seeks connectivity via the first coverage area. However, if the determined amount of time is less than a threshold, the mobile station seeks connectivity via the second coverage area.

18 Claims, 4 Drawing Sheets

TRANSITIONING TO PREVIOUS COVERAGE AREA TO EXPEDITE CALL SETUP

BACKGROUND

Wireless communication systems typically include various types of forward link channels that are used to transmit signals from base transceiver stations (BTSs) to mobile stations and various types of reverse link channels that are used to transmit signals from mobile stations to BTSs. The reverse link channels may include reverse traffic channels that are assigned to mobile stations for particular communication sessions, such as voice calls. The reverse link channels may also include access channels that mobile stations are able to use to communicate with the system. For example, a mobile station may use an access channel to originate a call or respond to a page.

A user of a mobile station may request connectivity in order to engage in a communication session. Upon a user of a mobile station requesting connectivity, a mobile station attempts to originate the connectivity. The communication session may be a communication session such as a voice-over-IP call. To originate a communication session, a mobile station may make an "access attempt," for example, by transmitting an access probe to a BTS. The access probe may specify the type of communication session desired. For example, the access probe may request packet-data connectivity or may request placement of a call.

In certain wireless communication systems, each wireless coverage area (e.g., sector) may have certain overhead control channel data messages and may periodically broadcast those messages to mobile stations in order to enable a mobile station to operate according to the parameters of the coverage area. Such messages may include, for example, quick configuration parameter messages, sync parameter messages, sector parameter messages, and access parameter messages. Until the mobile station has received control channel data messages of the coverage area in which the mobile station is operating, the mobile station cannot properly make an access attempt by sending an access probe. Accordingly, in order to engage in a communication session in a particular coverage area, it is necessary that a mobile station receive the overhead control channel data messages from the coverage area.

OVERVIEW

A method and system is disclosed for expediting call setup for wireless communications. A mobile station served by a wireless communication system may be in idle mode and under coverage of a first coverage area of the wireless communication system and a second coverage area of the wireless communication system. The mobile station may receive overhead channel data for the first coverage area. The mobile station may detect a trigger to initiate connectivity with the wireless communication system. Responsive to detecting this trigger, the mobile station may determine an amount of time until the mobile station will receive overhead channel data for the second coverage area. The mobile station may make a determination of whether the determined amount of time is greater than a threshold. If the determination is that the determined amount of time is greater than the threshold, the mobile station may then seek the connectivity via the first coverage area. On the other hand, if the determination is that the determined amount of time is not greater than the threshold, the mobile station may then seek the connectivity via the second coverage area.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Overview of an Exemplary Method and System

Disclosed herein is a method and system for expediting call setup for wireless communications, such as latency-sensitive communications. As mentioned above, in order to engage in a communication session in a particular coverage area, it is necessary that a mobile station receive the overhead control channel data from the particular coverage area. Typically, coverage areas in a wireless communication system broadcast overhead control channel data to mobile stations in the coverage area on a common synchronized periodic schedule. Therefore, neighboring coverage areas typically broadcast overhead control channel data at the same time.

In order to conserve power and air-link resources, a mobile station that is not actively engaged in a communication session may enter idle mode. When idle, a mobile station may "idle on" a particular coverage area. Typically, when idle, a mobile station regularly monitors the signal quality of various coverage areas, in order to determine which coverage area the mobile station should "idle on." That is, the mobile station may determine the coverage area whose control channel the mobile station will monitor for pages or other messages and on which the mobile station will seek to initiate communication if desired. The mobile station typically idles on the coverage area having the strongest signal quality.

A user may request connectivity when a mobile station is in idle mode. For example, a user may request to engage in a communication session such as a voice-over-IP (VoIP) call. The VoIP call may, for example, be a push-to-X (PTX) communication session. PTX service is an instant connect service that could be applied to establish real-time media connections carrying any kind of media (e.g., audio, video, etc.). A PTX communication is a latency-sensitive communication. It is beneficial to minimize call setup times for latency-sensitive communications, such as PTX sessions.

In some situations when in idle mode, a mobile station may move from idling on a first coverage area to idling on a second coverage area. For instance, a mobile station may move from idling on a first coverage area to idling on a second coverage area when the mobile station detects that the signal strength of the second coverage area is greater than the signal strength of the first coverage area.

In the event that a user requests connectivity shortly after a mobile station switches from idling on a first coverage area to idling on a second coverage area, the mobile station may not yet have received overhead control channel data from the second coverage area. Thus, the mobile station may need to wait to receive that data before sending an access probe in order to acquire the requested connectivity in the second coverage area. Waiting for that data may cause delay in setting up the requested connectivity.

In the exemplary embodiment, a mobile station may have recently switched from idling on a first coverage area to idling on a second coverage area. Upon receiving a request for connectivity, the mobile station may determine the amount of time until the mobile station will receive overhead channel data for the second coverage area. After determining this amount of time, the mobile station may determine whether this amount of time is greater than a predefined threshold amount of time. If the determination is that the amount of time is not greater than the threshold, then the mobile station may wait to receive the overhead channel data in the second coverage area. After receiving the overhead channel data in the second coverage area, the mobile station may seek connectivity in the second coverage area. On the other hand, if the determination is that the amount of time is greater than the threshold, then the mobile station may seek connectivity via the first coverage area. In the exemplary embodiment, the mobile station would have already received the necessary overhead channel data of the first coverage area and would have cached the data in its memory. Thus, the mobile station would not have to wait to receive such data in order to request connectivity in the first coverage area.

Beneficially, in accordance with the exemplary embodiment, a mobile station that has recently transitioned from idling on a first coverage area to idling on a second coverage area is capable of expediting call setup for latency-sensitive communications. In accordance with the exemplary embodiment, a mobile station is able to strike a balance between i) the desire to originate requested connectivity in the stronger sector that the mobile station is idling on and ii) the desire to not delay setting up a latency-sensitive communication. By determining whether the amount of time until the mobile station will receive overhead channel data for the second coverage area is greater than a threshold and making the connectivity decision based on that determined amount of time, a mobile station may strike a balance between the two factors mentioned above.

2. Exemplary Communication System Architecture

Figure 1:
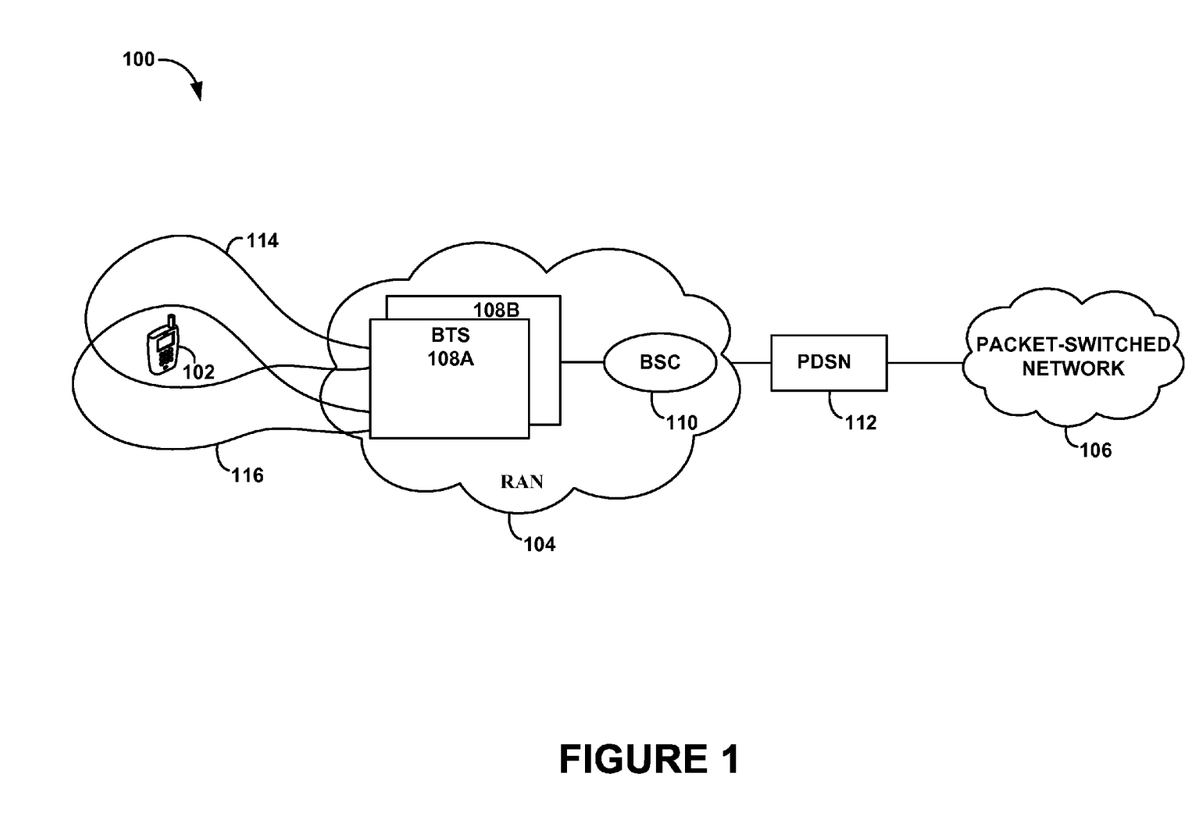
FIG. 1 is a simplified block diagram of a communication system in which an exemplary embodiment of the invention can be employed.

FIG. 1 is a simplified block diagram of a communication system in which an exemplary embodiment can be implemented. It should be understood that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. In addition, various functions described herein as being performed by one or more entities may be carried out by hardware, firmware, and/or software. For instance, various functions may be carried out by a processor executing program instructions stored in memory or another machine-readable medium, where "machine readable medium" is not a signal but is a storage medium.

System 100 includes a mobile station 102 that can be linked by a radio access network (RAN) 104 with a packet-switched network 106, such as an IP network. Mobile station 102 can take various forms, examples of which include a mobile phone, a personal digital assistant, a wirelessly equipped personal computer, or another wirelessly equipped device of any sort (whether technically "mobile" or fixed/stationary). RAN 104 generally functions, preferably in a conventional manner, to serve wireless mobile stations such as mobile station 102 and other mobile stations, so as to provide those devices with resources such as the ability to communicate with other entities (or with each other) via the RAN. As such, RAN 104 may take various forms, the details of which are not critical and may depend on the air interface protocol of the RAN 104 and on other factors.

A rudimentary RAN, for instance, could take the form of a simple wireless access point router (e.g., a Wi-Fi access point router) coupled with a local area network. Alternatively, the RAN can be more complex, such as a cellular wireless network including one or more base stations, controllers, switches, gateways, and/or other components now known or later developed. Further, RAN 104 may operate according to CDMA, EV-DO, iDEN, TDMA, AMPS, GSM, GPRS, UMTS, EDGE, WiMAX (e.g., IEEE 802.16), LTE, satellite, Wi-Fi (e.g., IEEE 802.11), and/or any other wireless technology or technologies now known or later developed. In the exemplary embodiment, RAN 104 operates according to EV-DO.

In one embodiment, as shown, RAN 104 may be a cellular RAN that includes at least one base transceiver station (BTS) 108. BTS 108 may then be coupled with a base station controller (BSC) 110, which may in turn be coupled with a packet data serving node (PDSN) 112 or other gateway to packet-switched network 110, so as to enable mobile station 102 to communicate via RAN 104 with entities on the packet-switched network 106.

As depicted, BTS 108 operates to define a first wireless coverage area 114 and a second wireless coverage area 116. In one embodiment, for instance, when BTS 108 is a single BTS, wireless coverage area 114 may be a first sector and wireless coverage area 116 may be a second sector. The sectors may be on the same radio frequency carrier. Alternatively, wireless coverage area 114 may be a wireless coverage area or sector of a first radio frequency carrier on BTS 108 and wireless coverage area 116 may be a wireless coverage area or sector of a second radio frequency carrier on BTS 108. In another embodiment, BTS 108 may comprise a plurality of base stations, such as BTS 108A and BTS 108B. In this embodiment, BTS 108A may operate to define wireless coverage area 114 and BTS 108B may operate to define wireless coverage area 116.

3. Exemplary Mobile Station Components

Figure 2:
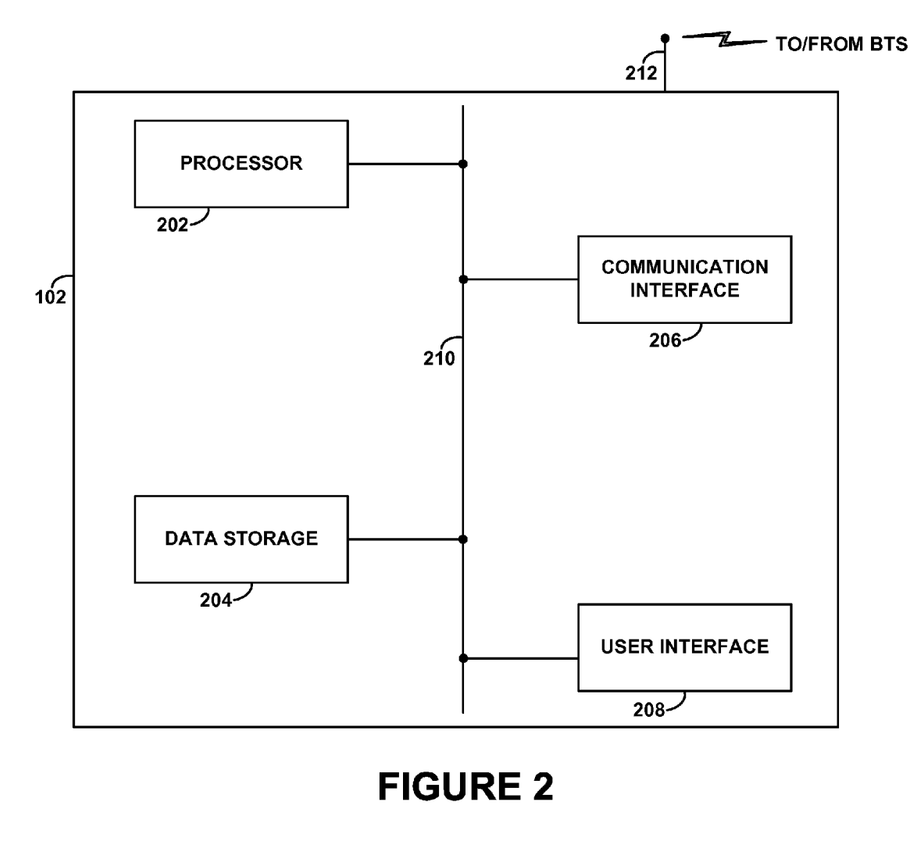
FIG. 2 is a simplified block diagram of an exemplary mobile station that can be used in the arrangement of FIG. 1.

A block diagram of an exemplary mobile station 102 is provided in FIG. 2, in order to illustrate some of the components that could be included in such a device to carry out the exemplary embodiment of the invention. As shown in FIG. 2, the mobile station 102 may include a processor 202, data storage 204, a wireless communication interface 206, and a user interface 208, all of which may be coupled together by a system bus or other mechanism 210. Each of these components may take various forms.

For instance, processor 202 could be one or more general purpose microprocessors and/or dedicated signal processors. Data storage 204 could be volatile and or nonvolatile memory, such as flash memory. Wireless communication interface 206 could comprise a chipset (not shown) compliant with a desired air interface protocol such as CDMA, EV-DO, TDMA, GSM, or 802.11x for instance. Further, the wireless communication interface may include an antenna 212 for sending and receiving signals.

User interface 208, in turn, may facilitate interaction with a user, to receive voice from a user and play out voice to a user, and to receive user instructions to initiate or conclude a communication session. By way of example, the user interface may include a microphone (not shown) for receiving analog speech signals from a user and a speaker (not shown) for playing out analog speech signals to a user. Further, user interface may include analog-to-digital conversion circuitry (not shown) for converting between analog voice signals and digital voice signals. And still further, the user interface may include a keypad and a TALK button (e.g., a PTX button), which the user can engage in order to dial a number and initiate connectivity, respectively.

In the exemplary embodiment, data storage 204 holds a set of logic (e.g., computer instructions) executable by processor 202 to carry out various functions described herein. For example, responsive to detecting a trigger to initiate connectivity, processor 202 could determine an amount of time until the mobile station will receive overhead channel data for a second coverage area. Next, processor 202 could make a determination of whether the determined amount of time is greater than a threshold, and then determine which wireless coverage area to initiate connectivity with, based on that decision. Alternatively, these functions can be carried out by firmware and/or hardware.

4. Exemplary Operation

Figure 3:
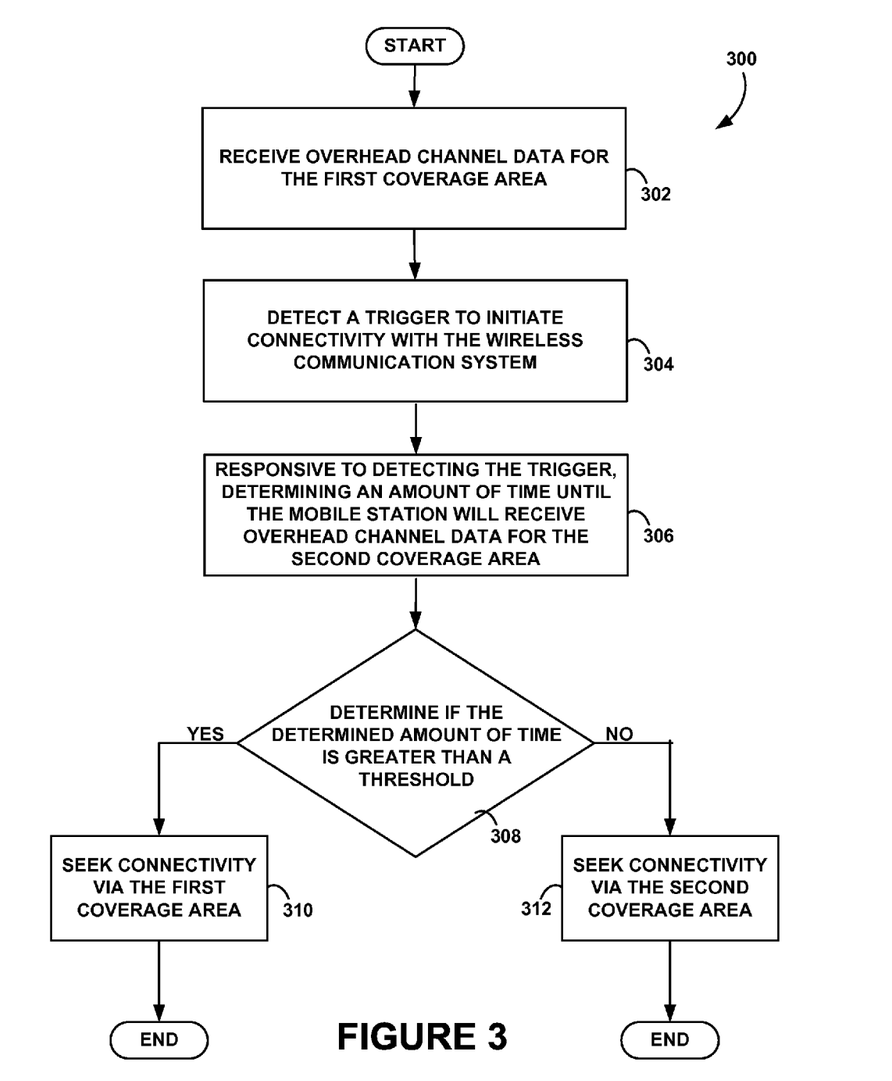
FIG. 3 is a flow chart of a method that can be carried out in accordance with the exemplary embodiment of the invention.
Figure 4A:
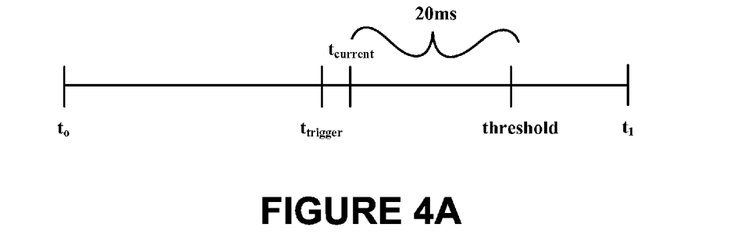
FIGS. 4A-4C are depictions of timelines, in accordance with the exemplary embodiment of the invention.
Figure 4B:
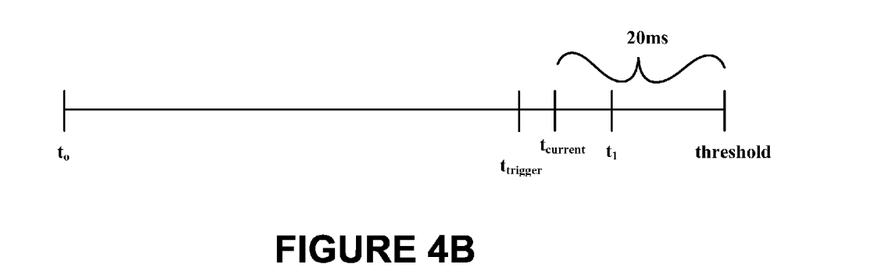
Figure 4C:
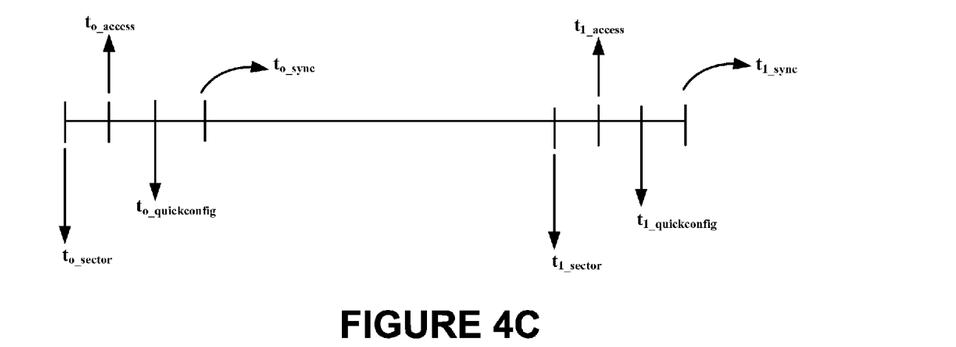

Referring next to FIGS. 3 and 4, a flow chart and timelines are provided to help illustrate some of the functions that can be carried out by a mobile station in a wireless communication system, such as the mobile station 102 depicted in FIGS. 1 and 2. By carrying out the functions illustrated in FIGS. 3 and 4, the mobile station may determine whether it would be beneficial to transition to a previous coverage area in order to expedite call setup.

FIG. 3 is a flow chart illustrating a method for expediting call setup for a wireless communication, such as a latency-sensitive communication. The example of FIG. 3 shows steps performed by the mobile station 102. A goal of method 300 is, after a mobile station has recently moved from idling on a first coverage area to idling on a second coverage area, to balance a desire to initiate connectivity in the strongest wireless coverage area with a desire to not delay in setting up a latency-sensitive communication.

As shown in FIG. 3, method 300 begins at step 302, where the mobile station receives overhead channel data for the first coverage area. As discussed above, overhead channel data is broadcast by a coverage area to enable mobile stations to operate according to the parameters of the coverage area. The overhead channel data dictates the parameters of the network to the mobile station. In other words, the overhead channel data includes information that may instruct a mobile station how to operate according to the parameters of the coverage area. Until a mobile station receives the overhead channel data from a coverage area, the mobile station cannot properly send an access probe to the coverage area in order to initiate connectivity via the coverage area.

In the exemplary embodiment, the mobile station receives overhead channel data for the first coverage area while the mobile station is active or idling on the first coverage area. The type of overhead channel data broadcast by a coverage area may depend on the air interface protocol the coverage area operates according to. For example, overhead channel data that is broadcast by a coverage area operating according to EV-DO includes quick configuration parameter messages, system parameter messages, and access parameter messages. These various parameter messages give the mobile station the information necessary to operate according to the parameters of the coverage area. On the other hand, overhead channel data that is broadcast by a coverage area operating 1xRTT includes a system parameter message, access parameter message, and a neighbor list message.

In the exemplary embodiment, before detecting the trigger at step 304, the mobile station transitions from idling on the first coverage area to idling on the second coverage area. A mobile station may move from idling on a first coverage area to idling on a second coverage area for a variety of reasons. For example, a mobile station may physically move from one sector to another sector. This may occur, for instance, when a user of a mobile station is driving along a highway. However, a mobile station may transition from idling on a first coverage area to idling on a second coverage area even when a mobile station is stationary. For example, as described above, a mobile station may move from idling on a first coverage area to idling on a second coverage area when the mobile station detects that the signal strength of the second coverage area is greater than the signal strength of the first coverage area. In an embodiment, the mobile station may measure the signal strength as $E_c/I_O$ values. This ratio is a ratio comparing (a) the power level at which the mobile station is receiving the forward link pilot channel ("$E_r$" for "energy per chip") and (b) the power level at which the mobile station is receiving all transmissions ("$I_O$") on the frequency (sector/carrier) on which the mobile station is operating (including the forward link pilot channel). It should be understood, however, that the mobile station could measure signal strengths in terms of parameters other than $E_O$ and $I_O$.

As depicted in FIG. 1, mobile station 102 may be under the coverage of first wireless coverage area 114 and second wireless coverage area 116. The signal strength in these coverage areas may fluctuate. Mobile station 102 may be idling on first wireless coverage area 114 when mobile station 102 is under the coverage of first wireless coverage area 114 and second wireless coverage area 116. However, the signal strength of coverage area 114 may go down and mobile station 102 may detect this fluctuation. After this fluctuation, the signal strength of wireless coverage area 116 may be greater than the signal strength of wireless coverage area 114, which mobile station 102 may detect. In response to detecting that the signal strength is greater in wireless coverage area 116, mobile station 102 may transition from idling on wireless coverage area 114 to idling on wireless coverage area 116.

Upon being idle in the second coverage area, the mobile station may not yet have the overhead channel data for the second coverage area. Therefore, the mobile station may be unable to initiate a requested connectivity in the second coverage area. However, as described above, the mobile station has the overhead channel data for the first coverage area. Therefore, at issue is whether the mobile station should i) wait to receive the overhead channel data for the second coverage area and then originate the connectivity in the second coverage area, or ii) simply originate the connectivity in the first coverage area, notwithstanding the fact that the mobile station has now moved over to idle on the second coverage area.

At step 304, the mobile station detects a trigger to initiate connectivity with the wireless communication system. For instance, the communication session may be a VoIP communication session or an emergency service communication session. In a preferred embodiment, a user of a mobile station activates a trigger to initiate a latency-sensitive communication session, such as a push-to-talk (PTT) (or more generally PTX) session. Other communication sessions are possible as well.

Returning to FIG. 3, responsive to detecting the trigger at step 304, the mobile station then determines an amount of time until the mobile station will receive overhead channel data for the second coverage area at step 306.

In order to determine this amount of time, the mobile station may use the fact that, in the exemplary embodiment, the wireless communication system 100 provides the overhead channel data for the first and second coverage areas on a common synchronized periodic schedule. For instance, in a coverage area operating according to EV-DO, the forward link defines a periodic control channel cycle on which overhead control channel parameters (and other information) can be broadcast. According to EV-DO, overhead channel parameters must be broadcast in each sector at least every four control channel cycles, but possibly more often. In this embodiment, if the period for sending control channel data is every three control channel cycles, then each sector (or, more generally, coverage area) in the radio network controller (RNC) coverage area may broadcast its control channel data in control channel cycle 1, then control channel cycle 4, then control channel cycle 7, and so forth. Other cycles (i.e., periodic schedules) are possible as well. It should be understood that the schedule of broadcasting overhead channel data depends on how the network is configured to broadcast those messages.

Given that the overhead channel data gets broadcast on substantially the same periodic schedule on both wireless coverage area 114 and wireless coverage area 116, the mobile station can use the time of the last broadcast on wireless coverage area 114 to determine how long it will be until the mobile station will receive the overhead channel data in wireless coverage area 116. The mobile station can then decide, based on that determined amount of time, whether to wait to receive the overhead channel data and initiate connectivity in wireless coverage area 116 or whether to just go back to wireless coverage area 114 and initiate connectivity there. This process allows the mobile station to balance i) the desire to originate connectivity in the stronger sector and ii) the desire to not delay in establishing the connectivity.

The process of determining an amount of time until the mobile station will receive overhead channel data for the second coverage area at step 306 is further described with reference to FIG. 4A. In order to determine the amount of time until the mobile station will receive overhead channel data for the second coverage area, the mobile station may first determine a time $t_0$ when the mobile station most recently received overhead channel data for the first coverage area. Preferably, the mobile station tracks when it receives overhead channel data and stores this tracking information in data storage, such as data storage 204. Therefore, in order to determine $t_0$, the mobile station need only refer to the data storage in order to retrieve this stored information.

Then, based on the common synchronized periodic schedule and time $t_0$, the mobile station may determine a time $t_1$ when the mobile station will receive overhead channel data for the second coverage area. Since the mobile station knows the amount of time between receiving overhead messages in the first coverage area, based on the fact that the second coverage area broadcasts on the same schedule as the first coverage area, the mobile station can determine when it expects to receive overhead channel data for the second coverage area at time $t_1$.

Next, the mobile station may determine the amount of time until the mobile station will receive overhead channel data for the second coverage area. In the exemplary embodiment, this amount of time is a difference between time $t_1$ and a current time, such as $t_{current}$. The current time $t_{current}$ may be the same as $t_{trigger}$. However, determining both when the mobile station most recently received overhead channel data for the first coverage area and when the transmission of overhead data from the second coverage is expected to occur may take a certain amount of time after detecting the trigger. Therefore, $t_{curret}$ current may be after $t_{trigger}$, as depicted in FIGS. 4A and 4B.

In the exemplary embodiment, time $t_1$ is the time when the mobile station will receive all of the necessary overhead channel data for the second coverage area. Once the mobile station receives all of the necessary overhead channel data, the mobile station may be able to send an access probe to the second coverage area in order to initiate connectivity.

Returning to FIG. 3, at step 308, the mobile station determines if the determined amount of time is greater than a predefined threshold. The threshold may be set by design choice. In the exemplary embodiment, the threshold is a fixed amount of time. For example, the threshold may be between 1 millisecond and 500 milliseconds. Alternatively, the threshold could be much longer, such as 1.7 seconds or more. Other times are possible as well. Further, the predefined threshold may differ depending on the desired connectivity. The mobile station may apply different predefined thresholds for different types of connectivity when determining if the determined amount of time is greater than a predefined threshold. For instance, the predefined threshold applied after a request for PTX session may be lower than the predefined threshold applied after a request for VoIP call.

In an alternative embodiment, the threshold may be a percentage of time between transmissions of overhead channel data. The common synchronized schedule may define a period of time x between each transmission of overhead channel data. The threshold could be a certain percentage of period of time x. For instance, the question may be whether no more than 50% of the period of time x remains until overhead channel data will be received for the second coverage area. Other percentages of the period of time x are possible as well, such as 25% or 75%.

If the determined amount of time is greater than the set threshold, the mobile station may then seek connectivity via the first coverage area at step 310. Doing so expedites the call setup time, because the mobile station will not have to wait to receive the overhead channel data for the second coverage area. Rather, the mobile station may immediately seek connectivity via the first coverage area because the mobile station already has the overhead channel data for the first coverage area. For instance, the mobile station may have cached the overhead channel for the first coverage area that it has already received. In order to seek connectivity via the first coverage area, the mobile station may retrieve the cached overhead channel data for the first coverage area and then send an access probe based on the cached overhead channel data.

Reverting to the first coverage area may occur in the situation depicted in FIG. 4A. In this example, the threshold is set at 20 milliseconds. As shown, 20 milliseconds after $t_{current}$, the mobile station will not have received the overhead control channel data for the second coverage area, which is expected to occur at $t_1$. Therefore, rather than waiting a time greater than the threshold in order to receive overhead channel data for the second coverage area, in order to expedite call setup, the mobile station will initiate connectivity via the first coverage area.

If, on the other hand, the determined amount of time until the mobile station will receive overhead channel data for the second coverage area is less than the set threshold, the mobile station may seek connectivity via the second coverage area at step 312. The mobile station may wait to receive overhead channel data for the second coverage area. Then, responsive to receiving the overhead channel data for the second coverage area, the mobile station may use the received overhead channel data as a basis for sending an access probe to the second coverage area.

Waiting to receive overhead channel data for the second coverage area may occur in the situation depicted in FIG. 4B. In this example, the threshold is set at 20 milliseconds. As shown, the mobile station is expected to receive the overhead control channel data for the second coverage area within the 20 millisecond threshold period. Therefore, the mobile station will wait until time $t_1$ in order to receive the overhead channel data for the second coverage area. After receiving the overhead channel data, the mobile station will initiate connectivity via the second coverage area.

If the determined amount of time is equal to the predefined threshold, the mobile station may seek connectivity via the second coverage area. Alternatively, the mobile station may seek connectivity via the first coverage area.

It should be understood that all of the overhead channel data for a particular coverage area is not necessarily sent simultaneously. For example, under EV-DO, quick configuration parameter messages are transmitted at different times than the access and sector parameter messages. Whether parameter messages are sent at the same time or different times depends on how the particular network is configured to send the messages. For example, as depicted in FIG. 4C, delivery of different parameter messages of the overhead channel data may be separated by short time intervals. As shown, a sector parameter message may be sent at time $t_{0\_sector}$, an access parameter message may be sent at time $t_{0\_access}$, a quick configuration parameter message may be sent at time $t_{0\_quick\_config}$, and a sync parameter message may be sent at time $t_{0\_sync}$. The mobile station may keep track of the time between receiving these respective particular parameter messages of overhead channel data. The mobile station may then store the time between receiving these respective particular parameter messages in the mobile station's memory. Based on the time between receiving the various parameter messages and $t_{0\_sector}$, $t_{0\_access}$, $t_{0\_quick\_config}$, and $t_{0\_sync}$, the mobile station may determine $t_{1\_sector}$, $t_{1\_access}$, $t_{1\_quick\_config}$, and $t_{1\_sync}$.

As mentioned above, the amount of time until the mobile station will receive overhead channel data for the second coverage area at step 306 is preferably the amount of time until the mobile station will receive all of the necessary overhead channel data. However, in alternative embodiments, this is not required. For instance, the amount of time could be when the first overhead control channel parameter message is received. For example, the amount of time could be the amount of time until $t_{1\_sector}$, as shown in FIG. 4C. Alternatively, the amount of time could be when 50% of the overhead channel data is received.

While the above example is described in regards to coverage areas operating according to EV-DO, it should be understood that the method may be applicable to other wireless coverage areas operating according to other wireless technologies by appropriately determining when it will be possible to initiate connectivity via a second coverage based on when the mobile station will have received the necessary overhead channel data.

Beneficially, method 300 allows a mobile station to expedite call setup after the mobile station has moved from idling on a first coverage area to idling on a second coverage area. A mobile station may balance the desire to initiate connectivity on the stronger coverage area and the desire to not delay in setting up latency-sensitive communications. A mobile station may determine that it would be advantageous to return the first coverage area and initiate connectivity via that coverage area in order to minimize call setup time, despite having to move back to a coverage area with a weaker signal. Alternatively, a mobile station may remain on the second coverage area and wait to receive the necessary overhead channel data to initiate connectivity via the second coverage area if it is determined that call setup time will not be that large of an issue. Preferably, this action allows the mobile station to remain operating in the coverage area having a stronger signal.

5. Conclusion

An exemplary embodiment of the present invention has been described above. Those skilled in the art will understand, however, that changes and modifications may be made to this embodiment without departing from the true scope and spirit of the present invention, which is defined by the claims.

We claim:

1. In a mobile station served by a wireless communication system, wherein the mobile station is operating in idle mode, and wherein the mobile station is under coverage of a first coverage area of the wireless communication system and a second coverage area of the wireless communication system, a method comprising:
   receiving overhead channel data for the first coverage area;
   detecting a trigger to initiate connectivity with the wireless communication system;
   responsive to detecting the trigger, determining an amount of time until the mobile station will receive overhead channel data for the second coverage area, wherein the wireless communication system provides the overhead channel data for the first and second coverage areas on a common synchronized periodic schedule, wherein determining the amount of time until the mobile station will receive overhead channel data for the second coverage area comprises (i) determining a time $t_0$ when the mobile station most recently received overhead channel data for the first coverage area, (ii) based on the common synchronized periodic schedule and based on time $t_0$, determining a next time $t_1$ when the mobile station will receive overhead channel data for the second coverage area, and (iii) determining, as the amount of time until the mobile station will receive overhead channel data for the second coverage area, a difference between time $t_1$ and a current time;
   making a determination of whether the determined amount of time is greater than a threshold, wherein the common synchronized periodic schedule defines a period of time between each transmission of overhead channel data, wherein the threshold is a predefined threshold that is a percentage of the period of time;
   if the determination is that the determined amount of time is greater than the threshold, then seeking the connectivity via the first coverage area; and
   if the determination is that the determined amount of time is not greater than the threshold, then seeking the connectivity via the second coverage area.

2. The method of claim 1, wherein receiving overhead channel data for the first coverage area comprises receiving the overhead channel data for the first coverage area while the mobile station is idling of the first coverage area, the method further comprising:
   before detecting the trigger to initiate connectivity with the wireless communication system, the mobile station transitioning from idling on the first coverage area to idling on the second coverage area, wherein detecting the trigger occurs while the mobile station is idling on the second coverage area.

3. The method of claim 2, wherein transitioning from idling on the first coverage area to idling on the second coverage area comprises:
  detecting a signal strength for the second coverage area being stronger than a signal strength for the first coverage area; and
  responsively transitioning from idling on the first coverage area to idling on the second coverage area.

4. The method of claim 1, wherein the percentage is between 25% and 75% of the period of time.

5. The method of claim 1, wherein the threshold is a fixed amount of time.

6. The method of claim 5, wherein the fixed amount of time is between 10 milliseconds and 1.7 seconds.

7. The method of claim 1, wherein seeking connectivity via the second coverage area comprises:
  waiting to receive overhead channel data for the second coverage area;
  receiving the overhead channel data for the second coverage area; and
  responsive to receiving the overhead channel data for the second coverage area, using the received overhead channel data as a basis to sending an access probe to the second coverage area.

8. The method of claim 1, wherein seeking connectivity via the first coverage area comprises sending an access probe to the first coverage area, wherein the mobile station has memory, wherein the mobile station caches the received overhead channel data for the first coverage area in the memory, and wherein sending an access probe to the first coverage area comprises:
  retrieving the cached overhead channel data for the first coverage area; and
  sending the access probe based on the cached overhead channel data.

9. The method of claim 1, wherein the connectivity is push-to-X connectivity.

10. The method of claim 1, wherein the connectivity is voice-over-IP connectivity.

11. The method of claim 1, wherein the overhead channel data comprises data selected from the group consisting of quick configuration parameter messages, sync parameter messages, sector parameter messages, and access parameter messages.

12. The method of claim 1, wherein the communication system operates according to a code division multiple access based technology.

13. The method of claim 1, wherein the overhead channel data for the second coverage area comprises all overhead channel data for the second coverage area.

14. In a mobile station served by a wireless communication system, wherein the mobile station is operating in idle mode, and wherein the mobile station is under coverage of a first coverage area of the wireless communication system and a second coverage area of the wireless communication system, a method comprising:
  receiving overhead channel data for the first coverage area, wherein receiving overhead channel data for the first coverage area comprises receiving the overhead channel data for the first coverage area while the mobile station is idling of the first coverage area;
  transitioning from idling on the first coverage area to idling on the second coverage area;
  detecting a trigger to initiate connectivity with the wireless communication system, wherein detecting the trigger occurs while the mobile station is idling on the second coverage area;
  responsive to detecting the trigger, determining an amount of time until the mobile station will receive overhead channel data for the second coverage area, wherein the wireless communication system provides the overhead channel data for the first and second coverage areas on a common synchronized periodic schedule, wherein determining the amount of time until the mobile station will receive overhead channel data for the second coverage area comprises (i) determining a time $t_0$ when the mobile station most recently received overhead channel data for the first coverage area, (ii) based on the common synchronized periodic schedule and based on time $t_0$, determining a next time $t_1$ when the mobile station will receive overhead channel data for the second coverage area, and (iii) determining, as the amount of time until the mobile station will receive overhead channel data for the second coverage area, a difference between time $t_1$ and a current time;
  making a determination of whether the determined amount of time is greater than a threshold, wherein the common synchronized periodic schedule defines a period of time between each transmission of overhead channel data, wherein the threshold is a predefined threshold that is a percentage of the period of time;
  if the determination is that the determined amount of time is greater than the threshold, then seeking the connectivity via the first coverage area; and
  if the determination is that the determined amount of time is not greater than the threshold, then seeking the connectivity via the second coverage area.

15. A communication device comprising:
  a network communication interface operable to (i) initiate connectivity with a coverage area, and (ii) transition from idling on a first coverage area to idling on a second coverage area;
  a user interface operable to interact with a user of the device;
  initiation logic operable, in response to a request from the user to initiate connectivity, (i) to determine an amount of time until the communication device will receive overhead channel data for a second coverage area, wherein a wireless communication system provides the overhead channel data for the first and second coverage areas on a common synchronized periodic schedule, wherein determining the amount of time until the communication device will receive overhead channel data for the second coverage area comprises (a) determining a time $t_0$ when the communication device most recently received overhead channel data for the first coverage area, (b) based on the common synchronized periodic schedule and based on time $t_0$, determining a next time $t_1$ when the communication device will receive overhead channel data for the second coverage area, and (c) determining, as the amount of time until the communication device will receive overhead channel data for the second coverage area, a difference between time $t_1$ and a current time, (ii) to make a determination of whether the determined amount of time is greater than a threshold, wherein the common synchronized periodic schedule defines a period of time between each transmission of overhead channel data, wherein the threshold is a predefined threshold that is a percentage of the period of time, (iii) to seek the connectivity via the first coverage area, if the determination is that the determined amount of time is greater than the threshold, and (iv) to seek the connectivity via the second coverage area, if the determination is that the determined amount of time is less than the threshold.

16. The communication device of claim 15, wherein the communication device is a cell phone.

17. The communication device of claim 15, wherein the connectivity is a push-to-X session.

18. The communication device of claim 15, further comprising data storage, wherein the data storage stores the initiation logic.

* * * * *